United States Patent
Kwon

(10) Patent No.: US 9,771,073 B2
(45) Date of Patent: Sep. 26, 2017

(54) ADAPTIVE CRUISE CONTROL SYSTEM IN VEHICLE AND METHOD THEREOF

(71) Applicant: MANDO CORPORATION, Pyeongtaek-si, Gyeonggi-do (KR)

(72) Inventor: Min-Su Kwon, Anyang-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/170,942

(22) Filed: Jun. 2, 2016

(65) Prior Publication Data
US 2016/0362105 A1 Dec. 15, 2016

(30) Foreign Application Priority Data
Jun. 12, 2015 (KR) .......... 10-2015-0083229

(51) Int. Cl.
| B60W 30/14 | (2006.01) |
| G01C 21/34 | (2006.01) |
| B60W 50/00 | (2006.01) |
| B60W 50/14 | (2012.01) |
| B60W 30/17 | (2012.01) |

(52) U.S. Cl.
CPC .......... *B60W 30/14* (2013.01); *B60W 30/17* (2013.01); *B60W 50/0097* (2013.01); *B60W 50/14* (2013.01); *G01C 21/34* (2013.01); *B60W 2420/52* (2013.01); *B60W 2520/10* (2013.01); *B60W 2520/105* (2013.01); *B60W 2550/22* (2013.01); *B60W 2550/402* (2013.01)

(58) Field of Classification Search
CPC .............................. B60W 30/14; G01C 21/34
USPC .......................................................... 701/408
See application file for complete search history.

(56) References Cited

U.S. PATENT DOCUMENTS

| 2007/0021915 A1* | 1/2007 | Breed | B60N 2/2863 |
| | | | 701/301 |
| 2007/0152804 A1* | 7/2007 | Breed | B60N 2/2863 |
| | | | 340/435 |
| 2007/0276600 A1* | 11/2007 | King | G08G 1/042 |
| | | | 701/301 |
| 2015/0197248 A1* | 7/2015 | Breed | G08G 1/09626 |
| | | | 701/93 |

* cited by examiner

*Primary Examiner* — Yazan Soofi
(74) *Attorney, Agent, or Firm* — Hauptman Ham, LLP

(57) ABSTRACT

An ACC system and method for controlling a vehicle are disclosed. An adaptive cruise control (ACC) system includes: a radar sensor unit which detects an object around a vehicle and a movement detector which measures a driving speed and acceleration of the vehicle and a determination unit which determines a stopped object to be a stopped vehicle when the stopped object is detected in front of the vehicle and a surrounding vehicle detected around the vehicle is detected to decelerate on the basis of the measured driving speed and acceleration and a controller which regards the stopped vehicle as a preceding vehicle and performs deceleration control.

10 Claims, 5 Drawing Sheets

ADAPTIVE CRUISE CONTROL SYSTEM IN VEHICLE AND METHOD THEREOF

CROSS-REFERENCE TO RELATED APPLICATION

This application claims the benefit of Korean Patent Application No. 10-2015-0083229, filed on Jun. 12, 2015 in the Korean Intellectual Property Office, the disclosure of which is incorporated herein by reference.

BACKGROUND

1. Field

Embodiments of the present disclosure relate to an adaptive cruise control (ACC) system in a vehicle and a method thereof, and more particularly, to an ACC system that, when a stopped object is detected in front of a vehicle, improves accuracy of a determination of whether the object is determined to be a stopped vehicle and control needs to be performed to deceleration and stop the vehicle, or whether the object is determined to be a stopped object and control needs to be performed to avoid crashing into the stopped object, and a method thereof.

2. Description of the Related Art

Generally, an adaptive cruise control (ACC) system which is used nowadays provides convenience to a user by maintaining a vehicle speed corresponding to a road condition of the outside even when the user does not put on a brake or accelerator when the user sets the vehicle speed to a constant speed.

Furthermore, recently, a smart cruise control (SCC) system capable of reducing speed or increasing speed while keeping a distance from a preceding vehicle by having a radar in a vehicle has been developed.

Such an ACC system in a vehicle controls a distance and relative speed between a controlled vehicle and a preceding vehicle using a radar sensor in the front of the vehicle, and controls an acceleration controller, an engine controller, and a brake controller using information including an angle with respect to a traveling direction and the like of the controlled vehicle, and preset vertical speed and acceleration limits of the controlled vehicle.

However, a conventional ACC system is designed to control a vehicle when the vehicle moves and another vehicle moves only in front of the vehicle because the conventional ACC system cannot determine whether a stopped object in front of the vehicle is a vehicle or a structure of a road using only a radar.

Accordingly, when a stopped object is detected, the conventional ACC system cannot recognize the stopped object as a stopped vehicle and cannot perform deceleration control, and thus there are problems in that a collision and the like occur.

Accordingly, although the ACC system includes a camera sensor as well as a radar sensor to detect a stopped vehicle positioned in front of the vehicle to prevent crashing into the stopped vehicle by detecting the stopped vehicle, such an ACC has a problem in that cost is increased.

SUMMARY

Therefore, it is an aspect of the present disclosure to provide improved accuracy so that, when a stopped object is detected and a plurality of vehicles running around a vehicle run at a reduced speed, the stopped object may be determined to be a stopped vehicle by determining as a situation like the plurality of vehicles are waiting for a signal.

In addition, the present disclosure provides an adaptive cruise control (ACC) system capable of quickly and properly responding to a stopped vehicle in front of the vehicle by automatically changing a direction or raising an alarm when a stopped object is determined to be the stopped vehicle, and a method thereof.

Additional aspects of the disclosure will be set forth in part in the description which follows and, in part, will be obvious from the description, or may be learned by practice of the disclosure.

In accordance with an aspect of the present invention, An adaptive cruise control (ACC) system includes: a radar sensor unit which detects an object around a vehicle; a movement detector which measures a driving speed and acceleration of the vehicle; a determination unit which determines a stopped object to be a stopped vehicle when the stopped object is detected in front of the vehicle and a surrounding vehicle detected around the vehicle is detected to decelerate on the basis of the measured driving speed and acceleration; and a controller which regards the stopped vehicle as a preceding vehicle and performs deceleration control.

When the surrounding vehicle which runs at a reduced speed is expected to stop in a preset distance range from the stopped object, the determination unit may determine the stopped object to be the stopped vehicle.

When surrounding vehicles are detected running at a reduced speed around the vehicle at both a left and a right of the vehicle, the determination unit may determine the stopped object to be the stopped vehicle.

The system may further include: a navigation unit which receives a position of the vehicle and stores map information of the position, wherein when it is determined that the received position of the vehicle is in front of a traffic light or intersection, the determination unit may determine the stopped object to be the stopped vehicle.

When the stopped object is determined to be an obstacle which is not the stopped vehicle, the controller may perform warning and deceleration controls.

In accordance with another aspect of the present invention, an ACC method comprises: detecting an object around a vehicle; measuring a driving speed and acceleration of the vehicle; determining a stopped object to be a stopped vehicle when the stopped object is detected in front of the vehicle, and a surrounding vehicle positioned around the vehicle is detected to be running at a reduced speed; and performing a deceleration control by regarding the stopped vehicle as a preceding vehicle.

When the surrounding vehicle which runs at reduced speed is expected to stop in a preset distance range from the stopped object, the stopped object may be determined to be the stopped vehicle.

When surrounding vehicles are detected around the vehicle at both a left and a right of the vehicle, the stopped object may be determined to be the stopped vehicle.

The method may further include: receiving a position of the vehicle, wherein when it is determined that the received position of the vehicle is in front of a traffic light or intersection, the stopped object may be determined to be the stopped vehicle.

When the stopped object is determined to be an obstacle which is not the stopped vehicle, warning and deceleration controls may be performed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
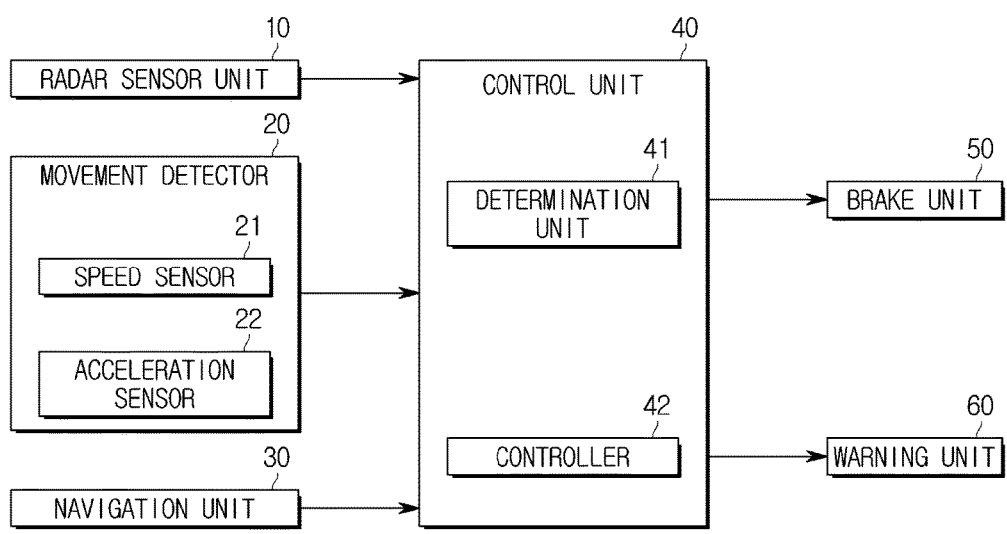
FIG. 1 is a block diagram illustrating an adaptive cruise control (ACC) system of a vehicle according to one embodiment of the present disclosure.

Hereinafter, the present disclosure will be described in detail with reference to the accompanying drawings. The following embodiments are provided to convey the scope of the present disclosure to those in the art.

However, the present disclosure is not limited to the embodiment provided in this specification and may be realized in different forms. In the drawings, portions which are not related to the description may be omitted to clarify the present disclosure, and sizes of components may be exaggerated for convenience of description.

Figure 2:
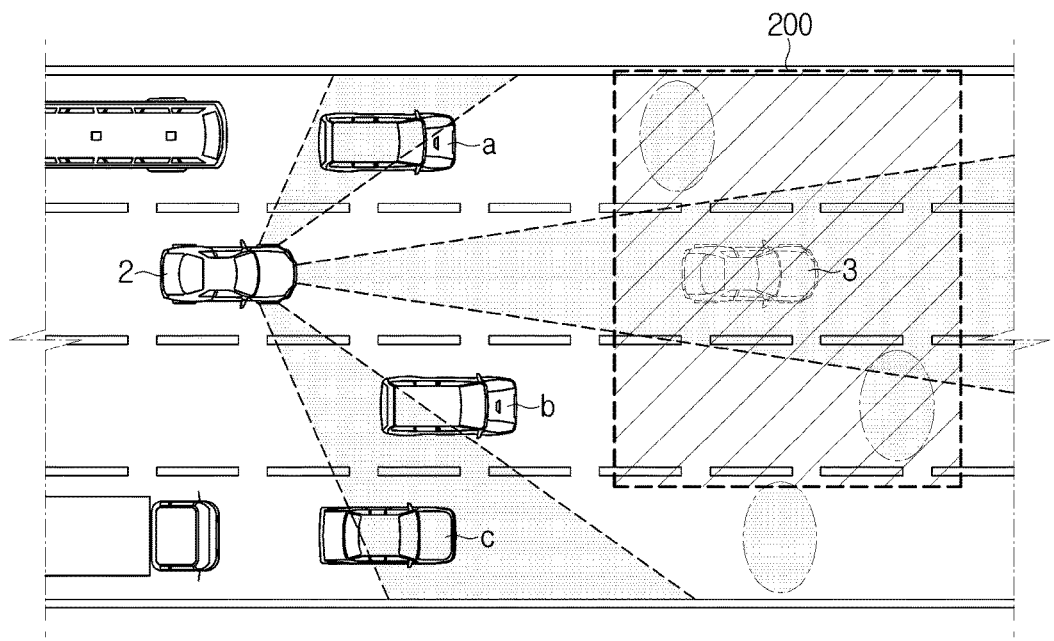
FIG. 2 is a schematic view illustrating a situation in which surrounding vehicles are detected according to one embodiment of the present disclosure.
Figure 3:
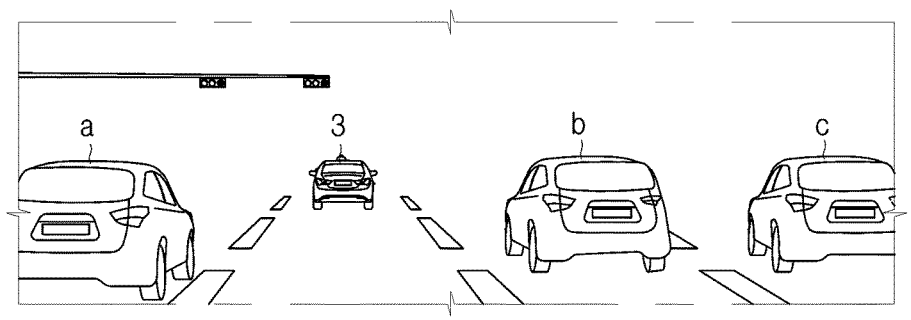
FIG. 3 is a schematic view illustrating one example of a vehicle according to one embodiment of the present disclosure.
Figure 4:
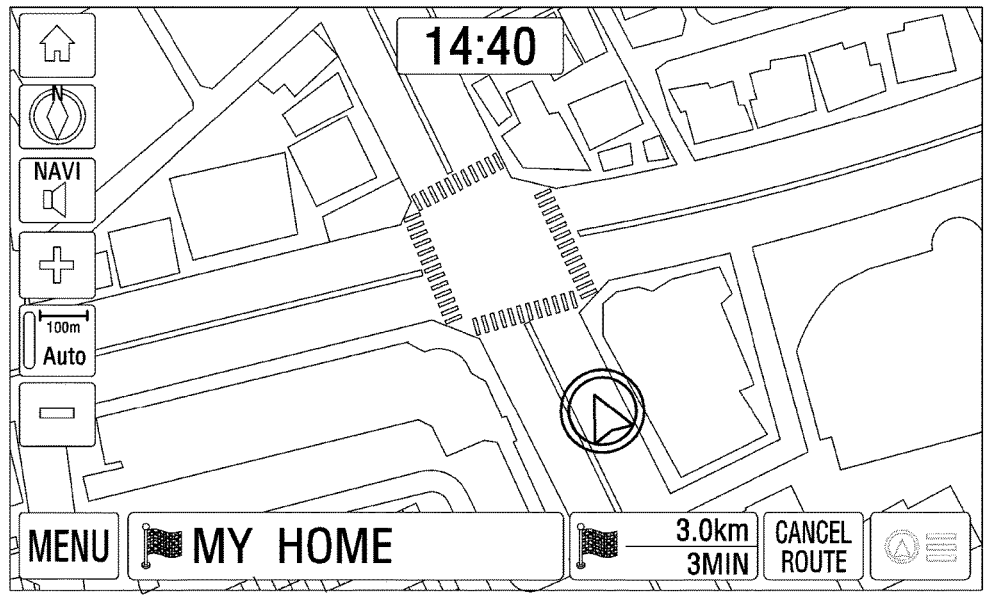
FIG. 4 is a view illustrating a navigation screen which shows a position of a vehicle according to one embodiment of the present disclosure.

FIG. 1 is a block diagram illustrating an adaptive cruise control (ACC) system 1 of a vehicle according to one embodiment of the present disclosure, FIG. 2 is a schematic view illustrating a situation in which surrounding vehicles are detected according to one embodiment of the present disclosure, FIG. 3 is a schematic view illustrating one example of a vehicle in which the ACC system 1 according to one embodiment of the present disclosure is installed, and FIG. 4 is a view illustrating a navigation screen which shows a position of a vehicle according to one embodiment of the present disclosure.

First, referring to FIG. 1, the ACC system 1 of a vehicle includes a radar sensor unit 10, a movement detector 20, a navigation unit 30, a control unit 40, a brake unit 50, and a warning unit 60.

The radar sensor unit 10 may adopt a radar sensor, which is not illustrated in the drawing, for detecting an obstacle positioned around a vehicle 2. Such a radar sensor, which is a sensor of the ACC system 1, may be installed in the front of the vehicle to detect a preceding vehicle, and may be installed at a side of the vehicle to detect an object and a vehicle around the vehicle 2 as illustrated in the vehicle 2 illustrated in FIG. 2. A 77 GHz radar may generally be used as such a radar sensor.

Here, the radar sensor unit 10 may obtain information of a distance between the vehicle 2 and a detected obstacle using the radar sensor included in the radar sensor unit 10, and may send the obtained information of the distance from the obstacle to the control unit 40.

Next, the movement detector 20, which detects a state of the vehicle 2, detects speed, acceleration, and the like of the vehicle 2, and sends the detected information to the control unit 40. Specifically, the movement detector includes a speed sensor 21 which measures the speed of the vehicle 2 and an acceleration sensor 22 which measures the acceleration of the vehicle 2.

The speed sensor 21, which is installed inside a wheel of the vehicle 2, may detect a rotational speed of a vehicle wheel and may send the detected signal to the control unit 40. Specifically, the speed sensor 21 may adopt a wheel speed sensor (not shown) for measuring the speed of the vehicle.

In addition, the acceleration sensor 22, which measures the acceleration of the vehicle 2, may include a horizontal acceleration sensor (not shown) and a vertical acceleration sensor (not shown). The horizontal acceleration sensor measures acceleration of a horizontal direction when an X-axis refers to a movement direction of the vehicle and an axis perpendicular to the movement direction (a Y-axis) refers to the horizontal direction. The vertical acceleration sensor may measure acceleration of the movement direction, that is, the X-axis of the vehicle.

Such an acceleration sensor in the acceleration sensor 22, which is a component that detects change in speed per unit time, detects dynamic forces such as acceleration, vibration, and shock and makes measurements using the principals of inertial force, electrostriction, and gyro. Next, the measured value of the acceleration sensor may be sent to the control unit 40.

The navigation unit 30 receives global positioning system (GPS) information and calculates a current position of the vehicle. That is, the navigation unit 30 receives time information from a plurality of satellites, calculates time differences between the time information from the satellites, and then finds a three dimensional (3D) position of a place where the signals are received. Since such technology of the GPS is already commercialized and used for various fields, a specific description thereof will be omitted.

In addition, a driving route of the vehicle may be calculated by receiving the GPS position information and using pre-stored map information.

Accordingly, the navigation unit 30 may also calculate a route through which the vehicle will run from a current position of the vehicle to a target position set by a driver as a driving route of the vehicle, and alternatively, when a target position is not set, the navigation 30 may also simply calculate a driving route estimated according to a driving direction of the vehicle 2 from the current position of the vehicle 2.

In addition, as the GPS position information is received, it may be determined whether the vehicle 2 is positioned in front of a traffic light or intersection.

Accordingly, the navigation unit 30 may send current position information of the vehicle to the control unit 40.

Next, the control unit 40 totally controls the ACC system 1 of a vehicle according to the embodiment of the present disclosure. Specifically, the control unit 40 mediates data access between various functional units included in the ACC system 1 and the control unit 40 of the vehicle, and includes a determination unit 41 which determines whether surrounding vehicles decelerate and a controller 42 which controls deceleration when it is determined that the vehicles are reducing speed and a stopped object in front of the vehicle is detected.

In addition, even though it is not illustrated in the drawings, the control unit 40 may include a main processor which mediates data access between various functional units and the control unit 40 hardware-wise and performs a determination of whether surrounding vehicles are reducing speed and deceleration control, and a memory which stores programs and data in the main processor.

Specifically, the memory (not shown) may include a non-volatile memory such as a flash memory, a read-only memory (ROM), an erasable programmable ROM (EPROM), an electrically EPROM (EEPROM), and the like as well as a volatile memory such as a static random access memory (S-RAM), a dynamic RAM (D-RAM), and the like.

The non-volatile memory may semi-permanently store a control program and control data for controlling an operation of the ACC system 1 included in the vehicle, and the volatile memory may read the control program and the control data from the non-volatile memory and temporarily store the control program and the control data, and temporarily store information of an obstacle detected by the radar sensor unit 10, information of the speed and acceleration of the vehicle detected by the movement detector 20, information of a position of the vehicle 2 obtained by the navigation unit 30, and various control signals output by the main processor.

Hereinafter, the determination unit 41 and the controller 42 which constitute the control unit 40 software-wise will be described.

Specifically, the determination unit 41 determines whether a front obstacle detected by the radar sensor unit 10 is a stopped vehicle. That is, as illustrated in FIG. 2, the determination unit 41 determines whether the front obstacle detected by the radar sensor positioned in the front of the vehicle is determined to be a stopped vehicle 3 as a preceding vehicle of the ACC system 1 according to the embodiment of the present disclosure. The determination unit 41 determines whether surrounding vehicles a, b, and c detected by the radar sensor unit 10 run at a reduced speed to determine whether the stopped vehicle 3 is the preceding vehicle.

At this point, the determination unit 41 may determine whether the detected surrounding vehicles a, b, and c run at the reduced speed by calculating a relative speed and a relative acceleration based on the speed and acceleration detected by the movement detector 20 included in the vehicle 2.

In addition, when the surrounding vehicles a, b, and c are determined to be running at the reduced speed, and the surrounding vehicles a, b, and c are expected to stop in a preset certain area 200 from a detected obstacle in front of the vehicle, the ACC system 1 according to the embodiment of the present disclosure determines the detected obstacle in front of the vehicle to be the stopped vehicle 3 in front of the vehicle.

Here, the preset certain area 200 refers to a region including a predetermined distance of left and right lanes of the detected obstacle in front of the vehicle. When an area of the region is enlarged, the number of the surrounding vehicles a, b, and c which are determinable may be increased.

Accordingly, the ACC system 1 according to the embodiment of the present disclosure may control reducing speed and stopping of the vehicle 2 by regarding the stopped vehicle 3 in front as a preceding vehicle.

In addition, when the determination unit 41 determines that a position of the vehicle 2 obtained by the navigation unit 30 is in front of a traffic light or intersection and the surrounding vehicles a, b, and c are reducing speed, the determination unit 41 may determine a stopped obstacle in front of the vehicle to be the stopped vehicle 3 in front of the vehicle which may be regarded as a preceding vehicle of the ACC system 1 according to the embodiment of the present disclosure.

Specifically, when the determination unit 41 determines that the surrounding vehicles a, b, and c are reducing speed, and the vehicle 2 is positioned in front of a traffic light as illustrated in FIG. 3 or the navigation unit 30 in the vehicle 2 receives a position of the vehicle 2 as being in front of an intersection as illustrated in FIG. 4, the determination unit 41 may determine the front obstacle to be the stopped vehicle 3 in front of the vehicle, determine the stopped vehicle 3 in front of the vehicle to be a preceding vehicle, and perform deceleration control according to the embodiment of the present disclosure.

In addition, when the radar sensor unit 10 detects a front obstacle and the determination unit 41 detects the surrounding vehicles a, b, and c at the left and right of the vehicle 3, the determination unit 41 may determine that the front obstacle is positioned at a center of a road and determine the front obstacle to be the stopped vehicle 3 in front of the vehicle. Accordingly, the control unit 40 may determine the stopped obstacle, that is, the stopped vehicle 3, in front of the vehicle to be a preceding vehicle, and perform deceleration control according to the embodiment of the present disclosure.

When the determination unit 41 determines an obstacle in front of the vehicle to be the stopped vehicle 3 in front of the vehicle, the controller 42 determines the stopped vehicle 3 in front of the vehicle to be a preceding vehicle and performs deceleration and stopping controls so that a crash does not occur.

When the determination unit 41 does not determine an obstacle in front of the vehicle to be the stopped vehicle 3 in front of the vehicle, the determination unit 41 determines the obstacle to be a stopped obstacle and simultaneously performs a warning control to warn a driver and deceleration and stopping controls so that a crash does not occur.

The brake unit 50 performs braking corresponding to reducing and stopping control signals from the control unit 40. Specifically, the brake unit 50 operates a brake (not shown) to decelerate corresponding to a braking distance in which crashing into the stopped vehicle 3 in front of the vehicle is determined not to occur.

The warning unit 60 may warn the driver that there is an obstacle in front of the vehicle depending on a control signal output by the control unit 40. Such a warning unit 60, even though it is not illustrated in the drawings, may include a display portion visually showing a warning or a sound portion acoustically sounding a warning to warn the driver.

In the above description, the structure of the ACC system 1 of a vehicle according to one embodiment has been described.

Hereinafter, an operation of the ACC system 1 of a vehicle according to one embodiment will be described.

Figure 5:
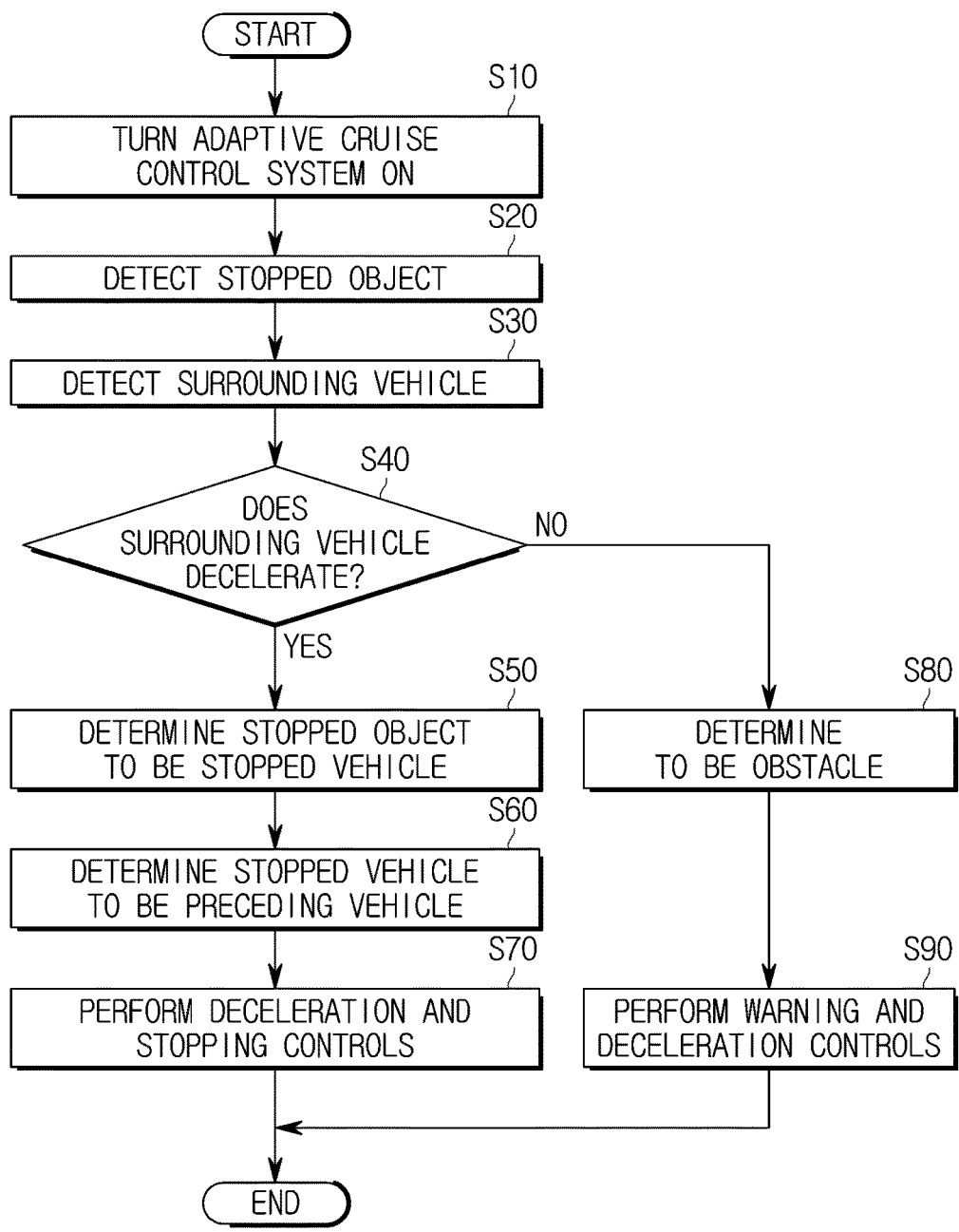
FIG. 5 is a flowchart of a method of the ACC of a vehicle according to the embodiment of the present disclosure.

FIG. 5 is a flowchart of a method of the ACC of a vehicle according to the embodiment of the present disclosure.

First, the ACC system 1 according to the embodiment of the present disclosure in the vehicle 2 is turned on (S10). The ACC system 1 then detects a front vehicle to be a preceding vehicle, and performs acceleration and deceleration control.

Next, the vehicle 2 detects a stopped object (S20). Specifically, the radar sensor included in the radar sensor unit 10 may detect the stopped object positioned in front of the vehicle 2. In addition, the vehicle 2 detects surrounding vehicles which run around the vehicle (S30). That is, radar sensors positioned at sides and in the front of the vehicle may detect the surrounding vehicles positioned in front and at the sides of the vehicle. Specifically, as illustrated in FIG. 2, the vehicle 2 may detect the surrounding vehicles a, b, and c which run on left and right lanes.

At this point, it is determined whether the surrounding vehicles are reducing speed (S40). Specifically, it may be determined whether the surrounding vehicles a, b, and c decelerate by calculating a relative speed of the surrounding vehicles a, b, and c detected by the radar sensor based on a speed and acceleration of the vehicle 2 measured by the movement detector 20 included in the ACC system 1 according to the embodiment of the present disclosure.

In addition, when the surrounding vehicles a, b, and c are determined to be running at a reduced speed (an example of S40), and the surrounding vehicles a, b, and c are expected to stop in a preset certain area 200 from the detected obstacle in front of the vehicle, the stopped object is determined to be the stopped vehicle 3 in front (S50).

In addition, when the vehicle 2 is determined to be positioned in front of a traffic light as illustrated in FIG. 3 or the navigation unit 30 in the vehicle 2 receives a position of the vehicle 2 as being in front of an intersection as illustrated in FIG. 4, the control unit 40 determines the stopped object to be the stopped vehicle 3 in front of the vehicle (S50).

Accordingly, when the determination unit 41 in the control unit 40 determines the stopped object to be the stopped vehicle 3 in front of the vehicle, the determination unit 41 determines the stopped vehicle 3 in front of the vehicle to be the preceding vehicle (S60), and performs deceleration and stopping controls so that the vehicle 2 does not crash into the stopped vehicle 3 in front of the vehicle (S70). That is, the brake unit 50 performs braking of the vehicle 2 depending on a control signal for reducing speed of the control unit 40.

However, when it is determined that the surrounding vehicles detected by the radar sensor unit 10 does not perform deceleration control, the determination unit 41 determines the stopped object in front of the vehicle to be an obstacle which is not a stopped vehicle (S80). Accordingly, warning and deceleration controls are performed so as not to crash into the stopped object in front of the vehicle and to inform a user (S90).

As is apparent from the above description, an ACC system can improve safety of the ACC system by automatically braking, steering, or raising an alarm in a specific situation in which a stopped object in front of a vehicle is waiting for a signal.

In addition, when a stopped object in front of the vehicle is determined to be a stopped vehicle, the ACC system can quickly and properly respond to the stopped vehicle in front of the vehicle by automatically changing a direction of the vehicle or raising an alarm.

In addition, since a stopped vehicle positioned in front of the vehicle is detected using only a radar sensor without using a camera sensor, production cost can be decreased, and the ACC system can control the vehicle by regarding a remotely positioned stopped vehicle as a preceding vehicle because the radar sensor can detect an object positioned at a remote position unlike a camera sensor which can detect only an object positioned in front of the vehicle in a short distance.

While one embodiment of the present disclosure has been illustrated and described above with reference to the drawings, the present disclosure is not limited to the above-described specific embodiments, various modifications may be made by those skilled in the art without departing from the spirit and scope of the present disclosure described in the appended claims, and the modifications may not be individually understood from the present disclosure.

What is claimed is:

1. An adaptive cruise control (ACC) system, comprising:
   a radar sensor unit which detects an object around a vehicle;
   a movement detector which measures a driving speed and acceleration of the vehicle;
   a determination unit which determines a stopped object to be a stopped vehicle when the stopped object is detected in front of the vehicle and a surrounding vehicle detected around the vehicle is expected to stop in a preset certain area; and
   a controller which regards the stopped vehicle as a preceding vehicle and performs deceleration control.

2. The ACC system of claim 1, wherein the preset certain area represents a preset distance range from the stopped object.

3. The ACC system of claim 2, wherein when surrounding vehicles are detected running at a reduced speed around the vehicle at both a left and a right of the vehicle, the determination unit determines the stopped object to be the stopped vehicle.

4. The ACC system of claim 3, further comprising a navigation unit which receives a position of the vehicle and stores map information of the position, wherein when it is determined that the received position of the vehicle is in front of a traffic light or intersection, the determination unit determines the stopped object to be the stopped vehicle.

5. The ACC system of claim 4, wherein when the stopped object is determined to be an obstacle which is not the stopped vehicle, the controller performs warning and deceleration controls.

6. An ACC method, comprising:
   detecting an object around a vehicle;
   measuring a driving speed and acceleration of the vehicle;
   determining a stopped object to be a stopped vehicle when the stopped object is detected in front of the vehicle, and a surrounding vehicle positioned around the vehicle is expected to stop in a preset certain area; and
   performing a deceleration control by regarding the stopped vehicle as a preceding vehicle.

7. The ACC method of claim 6, wherein when the preset certain area represents a preset distance range from the stopped object.

8. The ACC method of claim 7, wherein when surrounding vehicles are detected around the vehicle at both a left and a right of the vehicle, the stopped object is determined to be the stopped vehicle.

9. The ACC method of claim 8, further comprising receiving a position of the vehicle, wherein when it is determined that the received position of the vehicle is in front of a traffic light or intersection, the stopped object is determined to be the stopped vehicle.

10. The ACC method of claim 9, wherein when the stopped object is determined to be an obstacle which is not the stopped vehicle, warning and deceleration controls are performed.

* * * * *